(12) United States Patent
Bascom et al.

(10) Patent No.: US 7,226,877 B2
(45) Date of Patent: *Jun. 5, 2007

(54) LIQUID WATER IMPERMEABLE REINFORCED NONWOVEN FIRE BLOCKING FABRIC, METHOD FOR MAKING SUCH FABRIC, AND ARTICLES FIRE BLOCKED THEREWITH

(75) Inventors: Laurence N. Bascom, Amelia, VA (US); Warren F. Knoff, Richmond, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 109 days.

This patent is subject to a terminal disclaimer.

(21) Appl. No.: 11/023,153

(22) Filed: Dec. 27, 2004

(65) Prior Publication Data
US 2006/0141880 A1   Jun. 29, 2006

(51) Int. Cl.
 *B32B 27/12* (2006.01)
 *B32B 27/04* (2006.01)
(52) U.S. Cl. .............. 442/2; 442/35; 442/36; 442/38; 442/43; 442/46; 442/49; 442/50; 442/57; 442/58; 442/136; 442/164; 442/169; 442/352; 428/920; 428/921
(58) Field of Classification Search ........... 442/2, 442/35, 36, 38, 43, 46, 49, 50, 57, 58, 136, 442/164, 169, 352; 428/920, 921
See application file for complete search history.

(56) References Cited

U.S. PATENT DOCUMENTS

| | | | |
|---|---|---|---|
| 3,118,750 A | 1/1964 | Dunlap et al. | |
| 3,193,062 A | 7/1965 | Leonard et al. | |
| 3,546,056 A | 12/1970 | Thomas | |
| 3,565,749 A | 2/1971 | Wizon | |
| 3,597,299 A | 8/1971 | Thomas et al. | |
| 3,748,302 A | 7/1973 | Jones | |
| 3,767,756 A | 10/1973 | Blades | |
| 3,819,465 A | 6/1974 | Parsons et al. | |
| 3,869,429 A | 3/1975 | Blades | |
| 3,869,430 A | 3/1975 | Blades | |
| 4,562,675 A | 1/1986 | Baigas, Jr. et al. | |
| 4,743,495 A | 5/1988 | Lilani et al. | |
| 4,746,565 A * | 5/1988 | Bafford et al. | ............ 442/243 |
| 4,748,065 A | 5/1988 | Tanikella | |
| 4,840,838 A | 6/1989 | Wyss | |
| 5,153,056 A | 10/1992 | Groshens | |
| 5,208,105 A | 5/1993 | Ichibori et al. | |
| 5,316,834 A | 5/1994 | Matsuda et al. | |
| 5,417,752 A | 5/1995 | Paren et al. | |
| 5,470,648 A | 11/1995 | Pearlman et al. | |
| 5,506,042 A | 4/1996 | Ichibori et al. | |
| 5,691,036 A | 11/1997 | Lin et al. | |
| 6,383,623 B1 | 5/2002 | Erb, Jr. | |
| 6,579,396 B2 | 6/2003 | Erb, Jr. | |
| 6,596,658 B1 | 7/2003 | Putnam et al. | |
| 6,790,795 B2 | 9/2004 | Erb, Jr. et al. | |
| 6,955,193 B2 * | 10/2005 | Hainsworth et al. | .... 139/426 R |
| 2002/0098753 A1 | 7/2002 | Latham et al. | |
| 2002/0182967 A1 | 12/2002 | Erb, Jr. et al. | |
| 2003/0213546 A1 | 11/2003 | Latham et al. | |
| 2003/0232560 A1 | 12/2003 | Corner | |
| 2004/0028958 A1 | 2/2004 | Assink et al. | |
| 2004/0060119 A1 | 4/2004 | Murphy et al. | |
| 2004/0198125 A1 | 10/2004 | Mater et al. | |
| 2005/0215142 A1 | 9/2005 | Bascom et al. | |

FOREIGN PATENT DOCUMENTS

| | | |
|---|---|---|
| EP | 0 622 322 A1 | 2/1994 |
| EP | 0 622 322 B1 | 11/1994 |
| EP | 1 126 066 A1 | 8/2001 |
| FR | 2 761 381 A | 10/1998 |
| GB | 1064271 | 4/1967 |
| WO | WO 92/17629 | 10/1992 |
| WO | WO 98/42905 | 10/1998 |
| WO | WO 03/023108 A1 | 3/2003 |

* cited by examiner

*Primary Examiner*—Ula C. Ruddock

(57) ABSTRACT

This invention relates to a thin reinforced nonwoven fabric comprising a liquid impervious polymeric layer, a compressed web of crimped fiber, a binder, and a reinforcing scrim. The fabric bulks when exposed to heat or flame and is useful as a component for fire blocking mattresses, upholstery, and the like.

20 Claims, No Drawings

LIQUID WATER IMPERMEABLE REINFORCED NONWOVEN FIRE BLOCKING FABRIC, METHOD FOR MAKING SUCH FABRIC, AND ARTICLES FIRE BLOCKED THEREWITH

BACKGROUND OF THE INVENTION

1. Field of the Invention

This invention relates to a thin reinforced nonwoven fabric comprising a liquid impervious polymeric layer, a compressed web of crimped fiber, a binder, and a reinforcing scrim. The fabric bulks when exposed to heat or flame and is useful as a component for fire blocking mattresses, upholstery, and the like. This invention further relates to a fire-blocked article incorporating this fabric. This invention also relates to processes for making this reinforced nonwoven fabric and incorporating the fabric into an article.

2. Description of Related Art

The State of California has led the drive to regulate and reduce the flammability of mattresses and mattress sets in an attempt to reduce the number of lives lost in household, hotel, and institutional fires. In particular, the Bureau of Home Furnishings and Thermal Insulation of the Department of Consumer Affairs of the State of California issued Technical Bulletin 603 "Requirements and Test Procedure for Resistance of a Residential Mattress/Box Spring Set to a Large Open-Flame" to quantify the flammability performance of mattress sets. In many cases, mattress makers want to include a layer of fire blocking, however, they do not want that additional layer to detract from the existing aesthetics of their mattresses.

Strong thin fabrics, such as a combination of staple fibers and a thin reinforcing scrim fabric, could be desired in many instances because they are durable and also are not likely to be objectionable. Various methods are known in the art for combining staple fibers and scrim fabrics that lock the staple fibers in place. One such process is hydro-entangling, also known in various publications as hydrolacing, spunlacing, and water-jet treatments, where high pressure water jets impact the staple fibers and drive them into the scrim, consolidating the fiber and scrim together. Another process known in the art for combining staple fibers and scrim fabrics is by needlepunching. In this process, barbed needles grab the staple fibers and drive them into the scrim, or into the internal fiber batting, locking together the structure. Nonwoven sheets made by these processes mechanically and strongly entangle the staple fibers either with themselves or with the scrim or both, limiting the ability of the fabric to bulk when heated or exposed to flame.

Still another process known in the art for combining staple fibers and scrim fabric is by adhesive lamination or the addition of binders. In this process, a binder or adhesive is used to either adhere or bind layers or individual fibers together. For example, U.S. Pat. Nos. 6,579,396 and 6,383,623 to Erb and European Patent EP 622 332 to Yamaguchi et al. both disclose the use of a binder to maintain the loft or thickness of these thick fabrics; that is, the nonwoven remains in a lofted or bulked form so that it will have resiliency.

In addition to the desire for strong thin fabrics as fire blockers, in many instances, there is a desire to protect the internals of a mattress or other upholstered article from bodily fluids or other aqueous liquids. What is needed therefore, is a thin reinforced fabric that can function as both a fire blocker and as a liquid barrier.

SUMMARY OF THE INVENTION

This invention relates a reinforced nonwoven fabric for fire blocking an article, and an article comprising the fabric, the reinforced nonwoven fabric comprising a liquid water impermeable polymeric layer and an open mesh scrim having a first side and a second side, the first side of the scrim having crimped, heat-resistant organic fibers compressed thereon and held in a compressed state by a thermoplastic binder, wherein when the fabric is exposed to heat or flame, the fabric is capable of increasing its thickness by at least two times.

This invention also relates to a process for making a reinforced nonwoven fabric that bulks in heat or flame for fire blocking an article, comprising the steps of:

a) forming a first web comprising crimped heat-resistant organic fiber and binder fiber,
b) contacting the web with the first side of an open mesh scrim, said scrim having a first and a second side, to form a fabric assembly,
c) applying binder powder to the fabric assembly,
d) contacting the web with a polymeric film,
e) heating the fabric assembly and the polymeric film to activate the binder fiber and binder powder and soften the polymeric film,
f) compressing the fabric assembly to a compressed state wherein the polymeric film is laminated to the web, and
g) cooling the fabric assembly in a compressed state to form a reinforced nonwoven fabric.

DETAILS OF THE INVENTION

This invention relates to a thin reinforced nonwoven fabric for fire blocking an article that is impervious to aqueous liquids, and when exposed to heat or flame, the fabric is capable increasing to a thickness that is at least two times its original thickness. The fabric comprises an open mesh scrim having a first side and a second side, the first side having crimped, heat-resistant organic fibers compressed thereon and held in a compressed state by a thermoplastic binder. When the fabric is subjected to high heat or flame, the binder in the structure softens, releasing the restrained crimped fibers and allowing the thickness of the fabric to increase dramatically. This increase creates pockets of air in the fabric, which is believed to increase the fabric's thermal performance.

The fabric is capable of increasing its thickness in response to high heat or flame because the crimped heat-resistant organic fibers are compressed but not appreciably entangled in the fabric. Previously developed fiber-scrim sheets have concentrated on ensuring a high level of mechanical entanglement of the fibers with the scrim and or with the other fibers in the sheet. Typically, this mechanical entanglement is done by the imparting energy into lofty webs of fibers and/or the scrim that form the sheet to entangle the fibers and densify the sheet. When this is done, the fibers of the sheet are so entangled they are not free to move when subjected to heat and flame.

The fabrics of this invention have only enough entanglement of the fibers to manufacture the sheet; that is, the fibers are only entangled with each other to the extent needed to form a lightweight web that can be overlaid or combined with the open mesh scrim. No additional energy is imparted to the sheet to either entangle the fibers with each other or with the scrim. The lightweight web is then laminated to the scrim by heating and compressing the combination and then cooling the combination to set the structure while the crimped fibers are compressed and restrained. By compressing a lofty sheet in this manner, when the binder material is softened, the fibers in the sheet are free to return to a formally lofty state similar to the one they had prior to compression.

The fabrics of this invention also comprise a liquid water impermeable polymeric layer to prevent the passage of aqueous liquids through the fabric. If the fabric comprises one web of crimped fibers, the film is preferably overlaid on the web, however it can be overlaid on the second side of the scrim opposite the web. Preferably however, the fabric comprises at least one web of fibers on each of the first and second sides of the scrim and the polymeric layer is overlaid on one of these lightweight webs. In each case, this provides a fabric having as one outer surface the liquid water impermeable polymeric layer.

The reinforced nonwoven fabrics of this invention preferably have a total basis weight of from about 40 to 260 g/m$^2$ (1.2 to 7.7 oz/yd$^2$). Such fabrics also preferably have an overall thickness of about 0.026 to 0.25 centimeters (0.010 to 0.10 inches). The combination of only the lightweight fiber webs and scrim, when compressed, preferably has an thickness of 0.025 to 0.24 centimeters (0.010 to 0.10 inches) and also preferably has a basis weight in the range of 20 to 170 g/m$^2$ (0.6 to 5 oz/yd$^2$), with the scrim component preferably making up 3.4 to 34 g/m$^2$ (0.1 to 1.0 oz/yd$^2$) and the fibrous web component preferably ranging from 17 to 136 g/m$^2$ (0.5 to 4.0 oz/yd$^2$). The polymeric layer preferably has a thickness of from 0.012 to 0.076 mm (0.0005 to 0.003 inches). For many polymers useful in this invention, this thickness translates to polymeric layer having a preferred basis weight of from about 20 to 90 g/m$^2$ (0.6 to 2.7 oz/yd$^2$), preferably 29 to 85 g/m$^2$ (0.84 to 2.55 oz/yd$^2$).

The overall thickness of the reinforced fabric of this invention increases to a thickness that is at least two times its original thickness when exposed to high heat or flame and preferably to a thickness that is three times its original thickness. It is believed that temperatures as low as 150 centigrade are needed to initiate the bulking effect, and it is believed that starting at temperatures of about 225 centigrade the bulking action proceeds immediately. It is believed the maximum amount of bulking is achieved when the fabric is subjected directly to flame.

The reinforced nonwoven fabric of this invention comprises a liquid water impermeable polymeric layer. By "liquid water impermeable" it is meant that if an aqueous liquid is released or spilled on the fabric the liquids will not penetrate through the fabrics from one side to the other. Liquid water is meant to include any number of aqueous liquids that might commonly be spilled or released onto a mattress or upholstered furniture. Such aqueous liquids would include in addition to water such things as drinks such as soda and juices, bodily fluids such as urine.

The polymeric layer is preferably a sheet of polymer, such as a continuous film, however if desired a continuous coating of polymer can be used. Any durable polymer or combination of polymers may be used that has adequate adhesion to the lightweight webs or the thermoplastic binders used in the fabric. The inventors have found that polyurethane film makes a preferred polymeric layer because of its durability. Alternatively, a halogenated polymer film that would release flame-suppressing gases when burned, such as polyvinylchloride film, can be used if desired.

Preferably, the polymeric layer is placed in contact with and is adhered to the lightweight web of crimped heat resistant fibers and preferably forms one outer surface of reinforced fabric. The polymeric layer is very lightweight and only has a thickness of from 0.012 to 0.076 mm (0.0005 to 0.003 inches). Preferably the addition of the polymeric layer does not substantially change the flexibility of the underlying combination of fiber webs and scrim, allowing the overall fabric to be essentially as flexible and textile-like as the compressed nonwoven fabric without the polymeric layer.

The polymeric layer forms a continuous liquid barrier in the fabric. The polymeric layer is preferably adhered over the entire surface of the fiber web. That is, whether the polymeric layer is applied to the web and/or scrim by heating and softening the surface of a film or by contacting the web and/or scrim with a viscous polymer coating, the polymer layer is preferably attached to a majority of the fibers in which it is in contact with across the surface of the web.

The reinforced nonwoven fabric of this invention comprises crimped heat-resistant organic fibers. Such crimped fibers are preferably staple fibers that have cut lengths in the range of 0.4 to 2.5 inches (1 to 6.3 cm) preferably 0.75 to 2 inches (1.9 to 5.1 cm) and preferably have 2 to 5 crimps per centimeter (5 to 12 crimps per inch). By "heat resistant fiber" it is meant that the fiber preferably retains 90 percent of its fiber weight when heated in air to 500° C. at a rate of 20 degrees C. per minute. Such fiber is normally flame resistant, meaning the fiber or a fabric made from the fiber has a Limiting Oxygen Index (LOI) such that the fiber or fabric will not support a flame in air, the preferred LOI range being about 26 and higher. The preferred fibers do not excessively shrink when exposed to a flame, that is, the length of the fiber will not significantly shorten when exposed to flame. Fabrics containing an organic fiber that retains 90 percent of its fiber weight when heated in air to 500° C. at a rate of 20 degrees C. per minute tend to have limited amount of cracks and openings when burned by an impinging flame, which is important to the fabric's performance as a fire blocker.

Heat resistant and stable fibers useful in the reinforced nonwoven fire-blocking fabric of this invention include fiber made from para-aramid, polybenzazole, polybenzimidazole, or polyimide polymer. The preferred heat resistant fiber is made from aramid polymer, especially para-aramid polymer.

As used herein, "aramid" is meant a polyamide wherein at least 85% of the amide (—CONH—) linkages are attached directly to two aromatic rings. "Para-aramid" means the two rings or radicals are para oriented with respect to each other along the molecular chain. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. In the practice of this invention, the preferred para-aramid is poly(paraphenylene terephthalamide). Methods for making para-aramid fibers useful in this invention are generally disclosed in, for example, U.S. Pat. Nos. 3,869,430, 3,869,429, and 3,767,756. Such aromatic polyamide organic fibers and various forms of these fibers are available from DuPont Company, Wilmington, Del. under the trademark Kevlar® fibers.

Commercially available polybenzazole fibers useful in this invention include Zylon® PBO-AS (Poly(p-phenylene-2,6-benzobisoxazole) fiber, Zylon® PBO-HM (Poly(p-phenylene-2,6-benzobisoxazole)) fiber, available from Toyobo, Japan. Commercially available polybenzimidazole fibers useful in this invention include PBI® fiber available from Celanese Acetate LLC. Commercially available polyimide fibers useful in this invention include P-84® fiber available from LaPlace Chemical.

Alternatively, "heat resistant fiber" can include a cellulose fiber that retains at least 10 percent of its fiber weight when heated in air to 700° C. at a rate of 20 degrees C. per minute. These fibers are said to be char forming. Regenerated cellulose fibers having 10 percent or more inorganic compounds incorporated into the fibers are the preferred cellulose fibers. Such fibers, and methods for making such fibers, are generally disclosed in U.S. Pat. No. 3,565,749 and British Patent No. 1,064,271. A preferred char-forming regenerated cellulose fiber for this invention is a viscose fiber containing hydrated silicon dioxide in the form of a polysilicic acid with aluminum silicate sites. Such fibers, and methods for making such fibers are generally disclosed in U.S. Pat. No. 5,417,752 and PCT Pat. Appl. WO9217629. Viscose fiber containing silicic acid and having approximately 31 (+/−3) percent inorganic material is sold under the trademark Visil® by Sateri Oy Company of Finland.

The heat resistant fibers can be blended with other fibers, however it is preferred the other fibers not compromise the fabric's ability to function as a flame blocker. For example, up to 50 percent modacrylic fibers can be blended with the heat resistant fiber. Modacrylic fiber is useful because this fiber releases flame-suppressing halogen-containing gases when burned. By modacrylic fiber it is meant acrylic synthetic fiber made from a polymer comprising acrylonitrile. Preferably the polymer is a copolymer comprising 30 to 70 weight percent of an acrylonitrile and 70 to 30 weight percent of a halogen-containing vinyl monomer. The halogen-containing vinyl monomer is at least one monomer selected, for example, from vinyl chloride, vinylidene chloride, vinyl bromide, vinylidene bromide, etc. Examples of copolymerizable vinyl monomers are acrylic acid, methacrylic acid, salts or esters of such acids, acrylamide, methylacrylamide, vinyl acetate, etc.

The preferred modacrylic fibers used in this invention are copolymers of acrylonitrile combined with vinylidene chloride, and the copolymer may have in addition an antimony oxide or antimony oxides for improved fire retardancy. Such useful modacrylic fibers include, but are not limited to, fibers disclosed in U.S. Pat. No. 3,193,602 having 2 weight percent antimony trioxide, fibers disclosed in U.S. Pat. No. 3,748,302 made with various antimony oxides that are present in an amount of at least 2 weight percent and preferably not greater than 8 weight percent, and fibers disclosed in U.S. Pat. Nos. 5,208,105 & 5,506,042 having 8 to 40 weight percent of an antimony compound. The preferred modacrylic fibers are commercially available from Kaneka Corporation, Japan, such as their Protex C fiber which is said to contain 10 to 15 weight antimony oxides; or other fibers having less antimony oxide, in the range of 6 weight percent or less; or fibers having no antimony oxide can also be used.

The crimped organic fibers are preferably held in place with up to 30 parts by weight binder material. The preferred binder material is a combination of binder fiber and binder powder that is activated by the application of heat. Binder fibers are typically made from a thermoplastic material that has a softening point lower than the softening point of any of the other staple fibers in the fiber blend. Sheath/core bicomponent fibers are preferred as binder fibers, especially bicomponent binder fibers having a core of polyester homopolymer and a sheath of copolyester that is a binder material, such as are commonly available from Unitika Co., Japan (e.g., sold under the trademark MELTY®). Useful types of binder fibers can also include those made from polyamide, such as Griltex PA Biko BA 140 8 dpf, 2-inch cut-length nylon binder fibers; or binder fibers made from polypropylene, polyethylene, or polyester polymers or copolymers, the fibers containing only that polymer or copolymer, or as a bicomponent fiber in side-by-side or sheath/core configuration. Preferably the binder fibers are present in an amount of up to 20 percent of the reinforced nonwoven fabric. Binder powder is preferably present in an amount of up to 30 percent of the reinforced nonwoven fabric. The preferred binder powder is a thermoplastic binder powder such as copolyester Griltex EMS 6E adhesive powder or Gnlon SMS D1260 Aft62 polyamide (nylon) powder.

The reinforced nonwoven fabric of this invention also contains an open mesh scrim. Such scrims preferably have a basis weight in the range of 3.4 to 34 $g/m^2$ (0.1 to 1.0 $oz/yd^2$) and are referred to as an "open mesh" scrim because these scrims have only about 0.8 to 6 ends per centimeter (2 to 15 ends per inch) in both the warp and fill directions. The most preferred open mesh scrims have a basis weight in the range of 6.8 to 24 $g/m^2$ (0.2 to 0.7 $oz/yd^2$) and have preferably 1 to 4 ends per centimeter (3 to 10 ends per inch), in both the warp and fill direction. Generally, the mesh scrim is made by binding together two sets of cross-plied polyester continuous filaments or continuous filament yarns that have a binder coating. In some scrims, the ends in any one direction, say the fill direction, can consist of a plurality of continuous filaments that are disposed as desired on either side or both sides of the transversing warp ends. Representative open mesh scrims are available from Saint-Gobain Technical Fabrics of Niagara Falls, N.Y. under the name of Bayex® Scrim Fabrics. An open mesh scrim that is especially useful in the reinforced nonwoven fabrics of this invention is Saint-Gobain 2.7×2.7 scrim (Type QV3311/A31) having 2.7 ends/inch of 500 denier polyester in the fill direction and 2.7 ends/inch of 500 denier polyester in the warp direction. It has a nominal basis weight of 14.2 $g/m^2$ (0.42 $oz/yd^2$). This type of scrim provides adequate strength while not excessively contributing to flammability. It is also believed the open mesh also contributes to the formation of open pockets of air in the fabric when the fabric is exposed to high heat because a mesh scrim should restrain less of the heat resistant fibers due to the small number of binding points with the fibrous webs. The scrim can be comprised of thermoplastic or non-thermoplastic filaments, and can be aramid, nylon, glass, or polyester. If the scrim is a thermoplastic such as polyester, when the nonwoven fabric is burned, this mesh essentially disappears in the burned area as the crimped heat resistant fibers are bulking.

The preferred process for making the liquid impermeable reinforced nonwoven fabric of this invention preferably uses a lightweight film as the polymeric layer. Such a reinforced fabric can be made using a process that comprises the steps of:

a) forming a first web comprising crimped heat-resistant organic fiber and binder fiber,
b) contacting the web with the first side of an open mesh scrim, said scrim having a first and a second side, to form a fabric assembly,
c) applying binder powder to the fabric assembly,
d) contacting the web with a polymeric film,
e) heating the fabric assembly and the polymeric film to activate the binder fiber and binder powder and soften the polymeric film,
f) compressing the fabric assembly to a compressed state wherein the polymeric film is laminated to the web, and g) cooling the fabric assembly in a compressed state to form a reinforced nonwoven fabric.

The web may be formed by any method that can create low-density webs. For example, clumps of crimped staple fibers and binder fibers obtained from bales of fiber can opened by a device such as a picker. Preferably these fibers are staple fibers having a linear density of about 0.55 to about 1 10 dtex per filament (0.5 to 100 denier per filament), preferably 0.88 to 56 dtex/filament (0.8 to 50 denier/filament) with the linear density range of about 1 to 33 dtex/filament (0.9 to 30 denier/filament) being most preferred.

The opened fiber mixture can be then blended by any available method, such as air conveying, to form a more uniform mixture. Alternatively, the fibers can be blended to form a uniform mixture prior to fiber opening in the picker. The blend of fibers can then be converted into a fibrous web by use of a device such as a card, although other methods, such as air-laying of the fibers may be used. It is preferable that the fibrous web be used directly as a web from the card without any crosslapping. However, if desired the fibrous web can then be sent via conveyor to a device such as a crosslapper to create a crosslapped web by layering individual webs on top of one another in a zigzag structure.

Fibrous webs from one or more cards and an open mesh scrim can then be collected on a transporting belt. Preferably, the process has the additional step prior to step c) of contacting the second side of the open mesh scrim with a second fiber web comprising heat-resistant organic fiber and binder fiber. Typically the scrim is inserted between two webs to make the two- or more-layer web structure, or fabric assembly. Additional webs can also be laid on either of the two webs if needed. Binder powder is then applied to the combined webs and scrim (the fabric assembly) in a preferred amount of about 3.4 to 24 g/m$^2$ (0.1 to 0.7 oz/yd$^2$).

A polymeric film can then be overlaid onto the fabric assembly by placing the film onto the top surface of the up most fiber web. The combined film, webs, binder powder, and scrim are then conveyed through an oven at a temperature sufficient to soften and activate the binder fiber and powder and allow it to adhere the fibers together, and also soften the polymeric film to allow the film to adhere to the fibers that are in contact with the film. At the oven exit the sheet is preferably compressed between two steel rolls to consolidate the layers into a cohesive fabric. The fabric is then preferably cooled in this compressed state.

The reinforced nonwoven fabric of this invention may then be incorporated as fire blocking into an article such as a piece of furniture, or preferably, a mattress and foundation set. One method of fire blocking the mattress is by fully covering the panels and borders of the mattress core with the fabric of this invention, and sewing the fabric together at the seams to encapsulate the mattress. This insures the mattress will be fire blocked regardless of which panel or border is exposed to the flame.

Foundations, such as box springs, do not normally have to be completely fire blocked but generally are only required to have fire blocking on the borders with fire blocking being optional for the top face or panel of the foundation. However, the reinforced nonwoven fabric of this invention can be used in either the foundation border or panel as desired.

The reinforced nonwoven fabric is believed to provide adequate fire blocking to an article unable to pass California Technical Bulletin 603 issued July 2003, to enable that article to pass California Technical Bulletin 603 issued July 2003 without addition of a chemical flame retardant material. The reinforced nonwoven fabric can be incorporated into the article, such as a mattress, in any manner that allows that mattress to past the test when it would otherwise not pass.

TEST METHODS

ThermoGravametric Analysis. The fibers used in this invention retain a portion of their fiber weight when heated to high temperature at a specific heating rate. This fiber weight was measured using a Model 2950 Thermogravametric Analyzer (TGA) available from TA Instruments (a division of Waters Corporation) of Newark, Del. The TGA gives a scan of sample weight loss versus increasing temperature. Using the TA Universal Analysis program, percent weight loss can be measured at any recorded temperature. The program profile consists of equilibrating the sample at 50 degrees C.; ramping the temperature at from 10 or 20 degrees C. per minute from 50 to 1000 degrees C.; using air as the gas, supplied at 10 ml/minute; and using a 500 microliter ceramic cup (PN 952018.910) sample container.

The testing procedure is as follows. The TGA was programmed using the TGA screen on the TA Systems 2900 Controller. The sample ID was entered and the planned temperature ramp program of 20 degrees per minute selected. The empty sample cup was tared using the tare function of the instrument. The fiber sample was cut into approximately 1/16" (0.16 cm) lengths and the sample pan was loosely filled with the sample. The sample weight should be in the range of 10 to 50 mg. The TGA has a balance therefore the exact weight does not have to be determined beforehand. None of the sample should be outside the pan. The filled sample pan was loaded onto the balance wire making sure the thermocouple is close to the top edge of the pan but not touching it. The furnace is raised over the pan and the TGA is started. Once the program is complete, the TGA will automatically lower the furnace, remove the sample pan, and go into a cool down mode. The TA Systems 2900 Universal Analysis program is then used to analyze and produce the TGA scan for percent weight loss over the range of temperatures.

Thermal Performance Temperature. The thermal insulating properties of the fabrics at high temperatures and heat fluxes was measured using the same instrument that is used for the NFPA1971 Standard on Protective Ensemble for Structural Fire Fighting 2000 Edition Section 6–10. In order to characterize the materials of this invention, the instrument was operated in a data acquisition mode. A 2 cal/cm$^2$/second (8.38 J/cm$^2$/second) heat flux was imposed on the fabric for 90 seconds. During this time, the heat passing through the materials was measured using a calorimeter placed in direct contact with the back face (base layer) of the specimen. The materials were characterized in terms of the temperature of the calorimeter thermocouple at the end of the 90 seconds exposure. This value is directly proportional to the amount of heat that passed through the fabric.

Basis Weight. Basis weight of the fabric was measured using ASTM D6242-98.

EXAMPLE 1

A reinforced nonwoven fabric was prepared as follows. 42.5 parts by weight 2.2 dpf, 2" cut length Type 970 Kevlar® brand staple fiber, 42.5 parts by weight 3.5 dpf, 2" cut length Visil® 33AP staple fiber and 10 parts 4 dpf, 2" cut length Type 4080 Unitika binder fiber were blended as fed from bales to three cards. Fiber webs from the three cards were collected on a transporting belt to create a fiber web having a basis weight of approximately 2.2 oz/yd2. An open mesh scrim of polyester filament yarn was inserted between the two webs formed by the first two cards. The open mesh scrim was a Saint Gobain 2.7×2.7 scrim (Type QV3311/A31) having 2.7 ends/inch of 500 denier polyester in the fill direction and 2.7 ends/inch of 500 denier polyester in the warp direction) and had a basis weight of 0.42 oz/yd2. The resulting structure had two carded webs on one side of the open mesh scrim and one carded web on the other side of the scrim.

Griltex EMS 6E 125-130C adhesive powder was applied to the combined webs and scrim in an amount that brought the total sheet weight to 3.1 oz/yd2. A 1 mil thick polyurethane film from Deerfield Urethanes (PT6100 polymer with black pigment package) was combined with the scrim, binder powder and web. This structure was conveyed through an oven at 285° C. to melt the binder fiber and powder. At the oven exit the sheet was compressed between two steel rolls with 0" gap, which consolidated the components into a cohesive fabric. The fabric then cooled in this compressed state. The final composition of the fabric was approximately 25% Kevlar® fiber, 25% Visil® fiber, 9% binder fiber, 8% binder powder, 11% polyester scrim and 22% polyurethane film. The resulting fabric had a Thermal Performance Temperature (TPT) of 351° C.

EXAMPLE 2

Two square samples of approximately 5 cm×5 cm (2 inch×2 inch) in size were taken from the fabric of Example 1. The samples were measured with a ruler and the average thickness was found to be approximately 1 mm. The samples were then placed for 5 minutes in an oven operating at atmospheric pressure and at 200° C. The samples were removed from the oven an allowed to cool. The samples were then measured a second time with a ruler and the average thickness was found to have increased to 4 mm. The thickness of the samples occurred without substantial planer shrinkage of the fabric, however some deterioration of the polymeric film layer did occur. The average increase in thickness of the samples was roughly 4 times the original thickness of the sample.

EXAMPLE 3

Samples of Example 1 fabrics were then heated in an oven as in Example 2, however, each sample was heated to a different temperature and the time required for the samples to bulk was noted. The samples were then allowed to remain in the oven for 20 minutes, removed from the oven, and the condition of the film was noted. Finally, the thickness of the bulked samples was measured with a ruler. The samples showed thickness increases of from 2.5 times at 150 degrees C. to 4.5 times at 250 degrees C. without substantial planer shrinkage of the fabric. Results are summarized in Table 1.

TABLE 1

| Temperature ° C. | Time (min) | Thickness (mm) | Time to bulk (s) | PU film |
|---|---|---|---|---|
| Untreated | — | 1 | — | |
| 150 | 20 | 2.5 | 60 | Intact |
| 175 | 20 | 3 | 30 | Intact |
| 200 | 20 | 4 | 10 | Partly melted |
| 230 | 20 | 4 | Instant | Partly melted |
| 250 | 20 | 4.5 | Instant | Partly melted |

What is claimed is:

1. A reinforced nonwoven fabric for fire blocking an article, comprising a liquid water impermeable polymeric layer and an open mesh scrim having a first side and a second side, the first side of the scrim having crimped, heat-resistant organic fibers compressed thereon and held in a compressed state by a thermoplastic binder, wherein when the fabric is exposed to heat or flame, the fabric is capable of increasing its thickness by at least two times.

2. The reinforced nonwoven fabric of claim 1 wherein the fabric is capable of tripling its thickness when the fabric is exposed to heat or flame.

3. The reinforced nonwoven fabric of claim 1 further comprising crimped, heat-resistant organic fibers compressed on the second side of the scrim, the fibers held in a compressed state by a thermoplastic binder.

4. The reinforced nonwoven fabric of claim 1 wherein the polymeric layer is a film.

5. The reinforced nonwoven fabric of claim 1 wherein the polymeric layer is a coating.

6. The reinforced nonwoven fabric of claim 1 wherein the polymeric layer comprises a polyurethane polymer.

7. The reinforced nonwoven fabric of claim 1 wherein the polymeric layer comprises a poly vinyl chloride polymer.

8. The reinforced nonwoven fabric of claim 1 wherein the polymeric layer has a thickness of 0.0005 to 0.003 inches.

9. The reinforced nonwoven fabric of claim 1, wherein the heat-resistant organic fiber is a para-aramid fiber.

10. The reinforced nonwoven fabric of claim 9, wherein the para-aramid fiber is poly(paraphenylene terephthalamide).

11. The reinforced nonwoven fabric of claim 1, wherein the heat-resistant organic fiber is made from a polymer selected from the group consisting of polybenzazole, polybenzimidazole, and polyimide polymer.

12. The reinforced nonwoven fabric of claim 1, wherein the heat-resistant organic fiber is a cellulose fiber that retains at least 10 percent of its fiber weight when heated in air to 700° C. at a rate of 20 degrees C. per minute.

13. The reinforced nonwoven fabric of claim 12, wherein the cellulose fiber is a viscose fiber containing hydrated silicon dioxide in the form of a polysilicic acid with aluminum silicate sites.

14. The reinforced nonwoven fabric of claim 1, wherein the heat-resistant organic fiber is blended with up to 50 weight percent modacrylic fibers.

15. The reinforced nonwoven fabric of claim 1, wherein the thermoplastic binder comprises binder fiber.

16. The reinforced nonwoven fabric of claim 1, wherein the thermoplastic binder comprises a combination of binder fiber and binder powder.

17. The reinforced nonwoven fabric of claim 1 wherein the open mesh scrim comprises thermoplastic material.

18. A fire blocked article comprising the reinforced nonwoven fabric of claim 1.

19. A fire blocked mattress comprising the reinforced nonwoven fabric of claim 1.

20. Fire blocked upholstered furniture comprising the reinforced nonwoven fabric of claim 1.

* * * * *